United States Patent
Stretch et al.

(10) Patent No.: US 6,543,396 B2
(45) Date of Patent: Apr. 8, 2003

(54) ELECTRONICALLY CONTROLLED MAGNETORHEOLOGICAL FLUID BASED COOLING FAN DRIVE ASSEMBLY

(75) Inventors: Dale A. Stretch, Novi, MI (US); William Eybergen, Windsor (CA); Wade A. Smith, Mayville, MI (US); David Turner, Bloomfield Hills, MI (US); Thomas A. Gee, Allen Park, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/758,494

(22) Filed: Jan. 11, 2001

(65) Prior Publication Data
US 2002/0088411 A1 Jul. 11, 2002

(51) Int. Cl.[7] .................................................. F01P 7/04
(52) U.S. Cl. .................................. 123/41.12; 123/41.49
(58) Field of Search .......................... 123/41.05, 41.09, 123/41.13, 41.46, 41.47, 41.48, 41.49, 41.56, 41.57, 41.63, 41.65

(56) References Cited

U.S. PATENT DOCUMENTS 4,920,929 A * 5/1990 Bishop ..................... 123/41.49
5,896,965 A * 4/1999 Gopalswamy et al. ..... 192/21.5
6,173,823 B1 * 1/2001 Moser et al. ............... 192/21.5
6,245,253 B1 * 6/2001 Grasshoff et al. ........ 252/62.52

FOREIGN PATENT DOCUMENTS

| EP | 0 317 186 A2 | 5/1989 | |
|---|---|---|---|
| EP | 0 882 903 A1 | 12/1998 | |
| GB | 2 333 354 A | 7/1999 | |
| JP | 11311265 A | * 11/1999 | ......... F16D/27/115 |

* cited by examiner

Primary Examiner—Marguerite McMahon
(74) Attorney, Agent, or Firm—Artz & Artz, P.C.; Greg Dziegielewski, Esq.

(57) ABSTRACT

An electronically controlled magnetorheological fluid based fan drive assembly 60 used to increase the rotational speed of a coupled radiator cooling fan. Introducing a magnetic field within a working chamber 99 between a drive ring 74 and an output member 86 increases the viscosity of a magnetorheological fluid by changing the state of the fluid from a free flowing liquid to a semi-solid state. The shear rate of the magnetorheological fluid can be increased to create additional torque to drive the output member 86 and coupled radiator fan at a higher rotational speed to cool the engine coolant flowing through a closely coupled radiator. The magnetic field is induced by directing a flow of electrical current through an electronic coil 62 coupled within the fan drive assembly 60, and an electronic control unit coupled to the electronic coil 62 controls the amount of electrical current flowing through the coil 62. This maintains the temperature of the engine block within an acceptable temperature range at a particular engine speed.

15 Claims, 2 Drawing Sheets

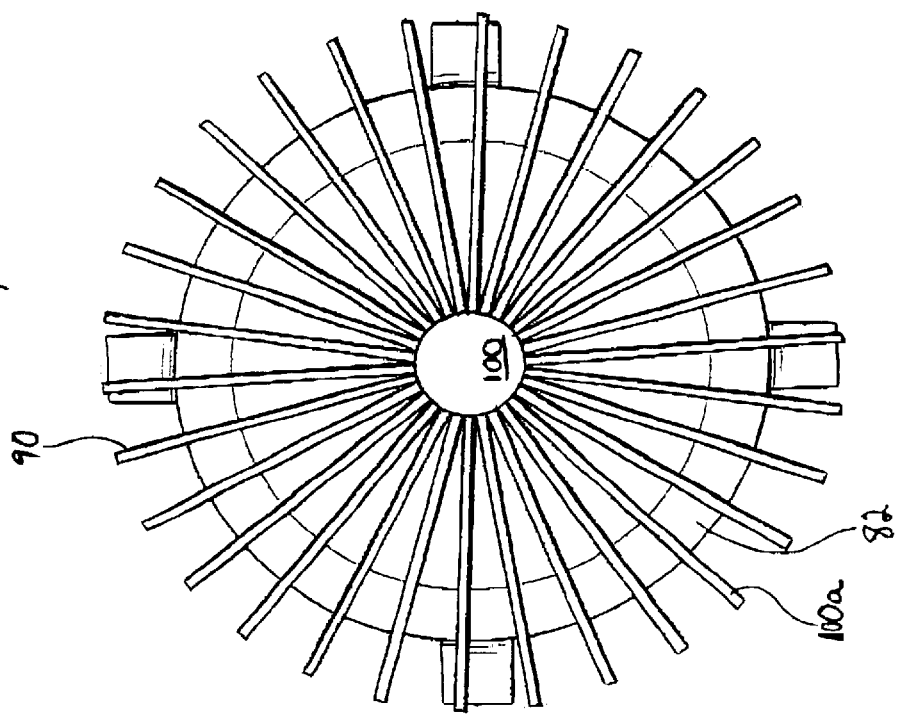
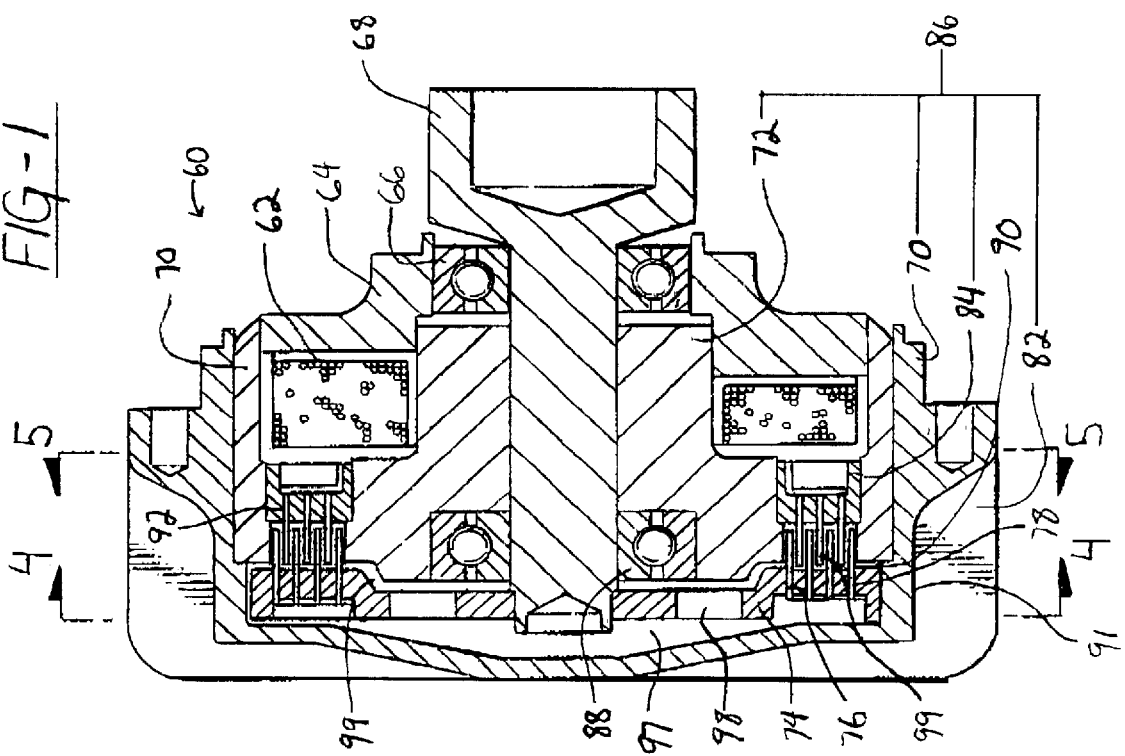

ELECTRONICALLY CONTROLLED MAGNETORHEOLOGICAL FLUID BASED COOLING FAN DRIVE ASSEMBLY

TECHNICAL FIELD

The invention relates generally to cooling systems and more specifically to an electronically controlled magnetorheological fluid based cooling fan drive assembly.

BACKGROUND ART

Cooling systems are used on vehicles today to provide cooling to an engine during operation. Fan drives are typically driven by the engine crankshaft at a fixed ratio to cool engine coolant as it flows through a radiator. Thus, as the engine speed is reduced, as is the trend in vehicles today to reduce emissions, the fan drive speed is correspondingly reduced. Similarly, as the engine speed increases, the fan drive speed correspondingly increases. This increased fan drive speed causes the engine block temperature to cool to less than optimal levels, resulting in less than optimal conditions that can affect emissions and fuel economy.

One method used to address these issues is to add a viscous fluid coupling to drive the radiator cooling fans. In a typical viscous fluid coupling, an input shaft drives an input coupling member (clutch) which is received within an output coupling member, and torque is transmitted from the input to the output, in the presence viscous fluid, by means of viscous shear drag. The coupling normally includes some sort of valving which controls the amount of viscous fluid within a viscous shear chamber, thereby controlling the ratio of the output torque and speed to the input torque and speed. Typically, this valving comprises a valve member that is moveable to cover or uncover a fill port disposed between a reservoir and viscous shear chamber (operating chamber).

One problem with currently available viscous couplings for fan drives is the complexity of the designs. Viscous fluid must be moved from a fluid reservoir chamber to a working chamber in order to couple or uncouple the input coupling member from the output coupling member. This requires a combination of moveable valve members, valve wiper arms, and relief chambers to move the viscous fluid both into and out of the working chamber. This adds complexity and cost to the viscous coupling.

More importantly, currently available viscous couplings are either incapable of being controlled to provide instantaneously cooling to an engine block or require a period of time to increase or decrease the amount of cooling available to the engine block. This time lag may have an effect on fuel economy and emissions at various engine speeds and engine temperatures.

It is thus highly desirable to limit the complexity of the viscous coupling and provide more precise control of engine cooling capabilities when using a viscous coupling.

SUMMARY OF THE INVENTION

The above and other objects of the invention are met by the present invention that is an improvement over known viscous couplings.

The present invention discloses a magnetorheological fluid based fan drive clutch that uses a tethered stationary coil and low cost concentric drum configuration. Magnetorheological fluid, normally thin, thickens between a pair of cylindrical drums when a magnetic field is applied. This thickening allows the magnetorheological fluid to shear between the drums and transmits torque from an external shaft to an internal shaft coupled to a fan. A stationary coil mounted on a steel support housing is electrically excited to create the desired magnetic field. The amount of electrical excitation is controlled as a function of engine speed and engine block temperature to maximum fuel economy and minimize emissions at various engine temperatures and speeds.

Other features, benefits and advantages of the present invention will become apparent from the following description of the invention, when viewed in accordance with the attached drawings and appended claims.

BRIEF DESCRIPTION OF THE DRAWINGS

FIG. 1 is a perspective view of a magnetorheological fluid based controlled fan drive mechanism according to the preferred embodiment of the present invention;

FIG. 2 is a left side view of FIG. 1;

BEST MODE(S) FOR CARRYING OUT THE INVENTION

Figure 3:
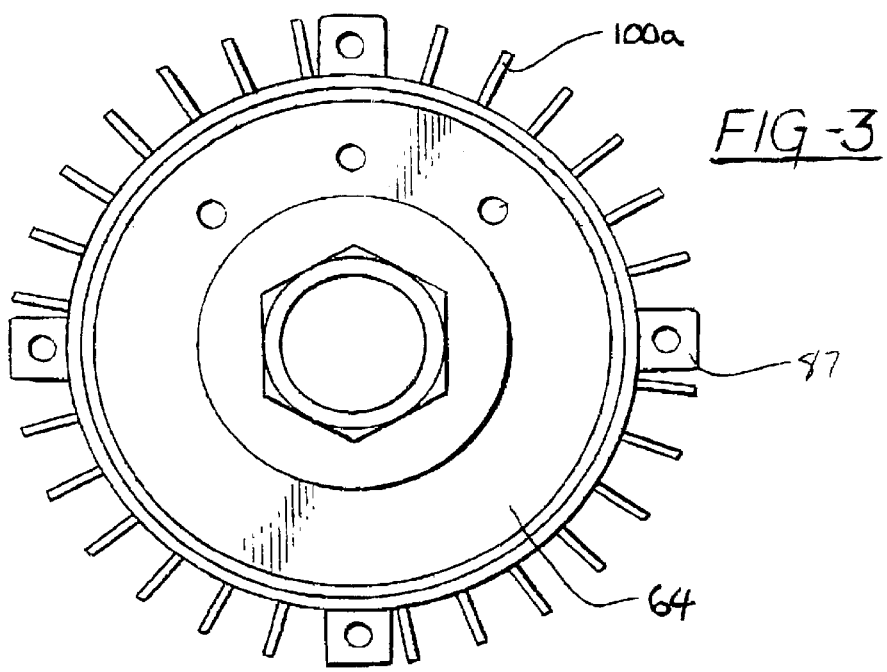
FIG. 3 is a right side view of FIG. 1.
Figure 4:
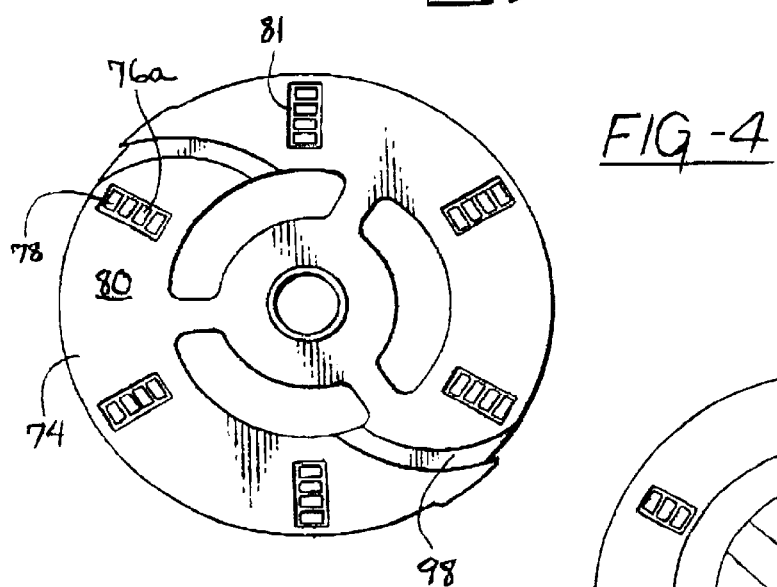
FIG. 4 is a cross-sectional view of FIG. 1, the cross-section being taken along line 4—4 in FIG. 1.
Figure 5:
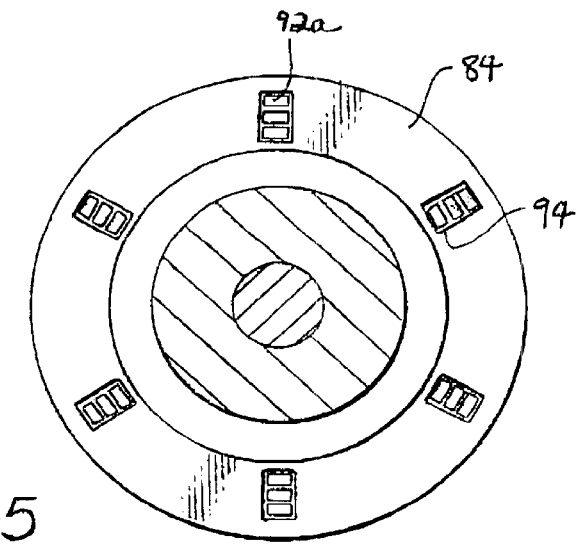
FIG. 5 is a cross-sectional view of FIG. 1, the cross-section being taken along line 5—5 in FIG. 1.

Referring now to FIGS. 1–5, a fan drive mechanism 60 according to a preferred embodiment of the present invention has a stationary electromagnetic coil 62 mounted on a steel support housing 64 that is supported by a bearing 66 onto an input shaft 68. The input shaft 68 is coupled to an engine crankshaft (not shown) in one of several methods that are contemplated within the art. For example, an output shaft (not shown) from a water pump (not shown) could be threaded onto the input shaft 68, wherein the input shaft 68 would rotate in response to engine speed via the output shaft.

A tether (not shown) is mounted on the steel support housing 64 with coil wires (not shown) projected through holes or slots (shown as 65 in FIG. 4) in the steel support housing 64. The steel support housing 64 is used to carry magnetic flux from an upper steel ring 70 to lower steel ring 72. A drive ring 74 has four partial concentric drive hoops 76 that are retained in grooves 78 on its outer side 80. These hoops 76 are bent over tabs 76a within pockets 81 on the outer side 80 for retention. A cover 82 is coupled to the upper steel ring 70, the lower steel ring 72, and a driven non-magnetic ring 84 to form an output member 86. A driven non-magnetic ring 84 is pressed into the upper steel ring 70 and lower steel ring 72 with the steel rolled over to maintain the ring 84 in place. A bearing 88 supports the output member 86. A fan (not shown) is bolted onto bolt holes 87 and is used to provide cooling airflow to a closely coupled radiator (not shown).

The driven non-magnetic ring 84 houses three partial concentric driven hoops 90, or driven concentric hoops, pressed into cur grooves 92 that are bent over tabs 92a in pockets 94 for retention. A magnetorheological ("MR") fluid is pumped through the drive and driven hoops 76, 90 by the rotational forces (centrifugal effect) between the drive hoops 76 and the driven hoops 90.

MR fluid is a controllable fluid medium that changes from a free flowing liquid to a semi-solid state when a magnetic field is applied by aligning magnetically polarized particles contained within the MR fluid to form particle chains. This effectively increases the viscosity of the MR fluid. When the magnetic field is removed, the MR fluid returns to its original liquid state. Advantageously, the response time for MR fluid to change between a steady-state semi-solid phase to a steady-state fluid (liquid) phase is in the range of a millisecond.

In operation, the input shaft 68 rotates in response to the rotation of an engine crankshaft as a function of engine speed. The input shaft 68 causes the drive ring 74 to rotate. As the drive ring 74 rotates, MR fluid is pumped to a fluid reservoir 97 from a collection area 91. The MR fluid is then pumped from the fluid reservoir 97 through a pump 98 located on the drive ring 74 to the working chamber 99. The MR fluid then flows between the drive hoops 76 and driven hoops 90. The MR fluid is sheared within a portion of the working chamber 99 defined between the drive hoops 76 and driven hoops 90 and returns to the collection area 91 in a continuous loop. The shearing within the working chamber 99 causes the output member 86 to rotate, producing torque proportional to the amount of slip (generally torque increases as a square of the rpm of the input shaft) This causes the coupled fan to rotate to provide cooling airflow to the radiator to cool the engine coolant. As heat is generated by the shearing of the MR fluid in the working chamber 99, a fin assembly 100 having a series of fins 100*a* is coupled to the cover 82 and functions to cool to maintain the MR fluid within an acceptable temperature range.

In the non-activated state, as described above, the viscosity of the fluid is relatively low; thus the amount of torque created to drive the fan is correspondingly low. In an activated state, which is caused by the excitation of the stationary coil 62 with electrical current, a magnetic flux field is generated that travels through the upper steel ring 70, the steel support structure 64, the lower steel ring 72, and through the concentric hoops 76, 90, thereby completing a circuit around the coil 62. This magnetic field causes the MR fluid pumping through the working chamber 99 to change from a free flowing liquid to a semi-solid state, which increases the amount of torque generated to drive the output member 86. This causes the fan to rotate more quickly and provide additional cooling to the radiator. An electronic controller (not shown) coupled to the coil by a pair of wires (not shown) controls the amount of current flowing through the coil 62, and thus controls the amount of torque created. The electronic controller directs the flow of electrical current to the stationary coil 62 to increase the fan speed at times when extra fan speed is desired, such as when the engine block temperature exceeds a predetermined maximum acceptable temperature at a particular engine speed.

The present invention offers a simplified design with which to control the rotational speed of a fan to provide adequate cooling for a cooling system. The use of an electronically controllable magnetorheological fluid based fan drive clutch mechanism that uses a tethered stationary coil and concentric drum configuration offers a low cost alternative to traditional viscous couplings that require complex valving and pumping to control the transfer of torque. The present invention controls the torque precisely and repeatably by simply controlling the amount of current sent to the coil, thereby creating a magnetic field to change the MR fluid quickly from a free flowing liquid to a semi-solid state. Notably, the MR fluid can change from a semi-solid state back to a free flowing liquid in the same time frame, thereby lessening the rotational speed of the fan at times when cooling is not desired. In this way, more precise control of cooling within a cooling system is achieved.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. An electronically controlled magnetorheological fluid based fan drive assembly 60, the assembly 60 being coupled to a fan to cool a closely coupled radiator, the assembly comprising:

a cover 82 having a rotating portion;

a plurality of fins 100*a* coupled to said rotating portion, said fins 100*a* used to cool the electronically controlled magnetorheological fluid based fan drive assembly 60 when said rotating portion is rotating;

an input shaft 68 rotatably mounted to said rotating portion;

a drive ring 74 coupled to said input shaft 68;

a plurality of drive ring partial concentric hoops 76 coupled to said drive ring 74;

an upper steel ring 70 coupled to said rotating portion;

a lower steel ring 72;

a driven ring 84 coupled to said upper steel ring 70 and said lower steel ring 72;

a plurality of driven ring partial concentric hoops 90 coupled to said driven ring 84;

a working chamber 99 between said drive ring 74 and said driven ring 84;

a non-rotating coil 62 located between said upper steel ring 70 and said lower steel ring 72;

an electronic control unit coupled to said non-rotating coil, wherein said electronic control unit controls an amount of electrical current flowing through said non-rotating coil 62; and a quantity of magnetorheological fluid contained within said working chamber 99, wherein the rotation of said drive ring 74 causes a portion of said quantity of magnetorheological fluid to shear within said working chamber 99 to rotate said driven ring 84.

2. The electronically controlled magnetorheological fluid based fan drive assembly 60 of claim 1 further comprising:

a fluid reservoir 97 defined between said drive ring 74 and said rotating portion, said fluid reservoir 97 in fluid communication with said working chamber 99; and a pump 98 located on said drive ring 74, wherein the rotation of said drive ring 74 causes said quantity of magnetorheological fluid to be pumped from said fluid reservoir 97 to said working chamber 99 by said pump 98.

3. The electronically controlled magnetorheological fluid based fan drive assembly 60 of claim 1, wherein said cover 82 has a non-rotating portion, said non-rotating portion being mounted on said input shaft 68 with a bearing 88, wherein said non-rotating coil 62 is coupled to said non-rotating portion.

4. The electronically controlled magnetorheological fluid based fan drive assembly 60 of claim 1, wherein each of said plurality of drive ring partial concentric hoops 76 is coupled to said drive ring 74 by pressing each of said plurality of drive ring partial concentric hoops 76 into a groove 78 and bending each of said plurality of drive ring partial concentric hoops 76 over a drive ring tab 76*a* contained in a drive ring pocket 81 on an outer side 80 of said drive ring 74; and wherein each of said plurality of driven ring partial concentric hoops 90 is coupled to said driven ring 84 by pressing each of said a plurality of driven ring partial concentric hoops 90 into a cur groove 92 and bending each of said plurality of driven ring partial concentric hoops 90 over a driven ring tab 92a contained in a pocket 94 on said driven ring.

5. The electronically controlled magnetorheological fluid based fan drive assembly 60 of claim 1, wherein the amount of rotational movement of said driven ring 84 is a function of the rotational speed of said input shaft 68, the composition of said quantity of magnetorheological fluid, and the viscosity of said portion of magnetorheological fluid being sheared within said working chamber 99.

6. The electronically controlled magnetorheological fluid based fan drive assembly 60 of claim 5, wherein the viscosity of said portion of said magnetorheological fluid is a function of the amount of magnetic field within said working chamber 99.

7. The electronically controlled magnetorheological fluid based fan drive assembly 60 of claim 6, wherein the viscosity of said portion of said magnetorheological fluid is a function of the amount of electrical current supplied to said non-rotating coil 62 by said electronic control unit.

8. A method of controlling the rotational speed of a fan used to cool engine coolant flowing through a radiator in a cooling system of an engine, the method comprising the steps of:

coupling the fan to an output member 86 of an electronically controlled magnetorheological fluid based fan drive assembly 60, said output member 86 having a cover 82 having a rotating portion, said rotating portion having a plurality of fins 100a coupled to said rotating portion, wherein said output member 86 and the fan rotate in response to torque generated by a shearing of a quantity of magnetorheological fluid within a working chamber 99 of said electronically controlled magnetorheological fluid based fan drive assembly 60, said working chamber 99 located between a plurality of driven hoops 90 on said output member 86 and a plurality of drive hoops 76 on a drive ring 74 of electronically controlled magnetorheological fluid based fan drive assembly 60, said shearing caused by the rotation of an input shaft 68 coupled to said drive ring 74 coupled to the engine and rotating at a speed corresponding to the speed of the engine; and increasing the viscosity of said quantity of magnetorheological fluid flowing through said working chamber 99, thereby increasing the amount of torque generated to drive said output member 86 and therein increasing the rotational speed of said fan.

9. The method of claim 8, wherein the step of increasing the viscosity of said quantity of magnetorheological fluid contained within said working chamber 99 comprises the step of increasing the viscosity of said quantity of magnetorheological fluid by changing said quantity of magnetorheological fluid flowing through said working chamber 99 from a free flowing liquid to a semi-solid state.

10. The method of claim 9, wherein the step of increasing the viscosity of said quantity of magnetorheological fluid by changing said quantity of magnetorheological fluid flowing through said working chamber 99 from a free flowing liquid to a semi-solid state comprises the step of introducing a magnetic field having a first strength through said working chamber 99.

11. The method of claim 10, wherein the step of introducing a magnetic field having a first strength through said working chamber 99 comprises the step of introducing a magnetic field having a first strength through said working chamber 99, said first strength being a function of engine speed, engine block temperature, and the composition of said quantity of magnetorheological fluid.

12. The method of claim 10, wherein the step of introducing a magnetic field having a first strength through said working chamber 99 comprises the step of directing a flow of a first quantity of electrical current through an electrical coil 62 coupled within said electronically controlled magnetorheological fluid based fan drive assembly 60, wherein said first quantity of electrical current induces a magnetic field having a first strength through said working chamber 99.

13. The method of claim 12, wherein the step of directing a flow of a first quantity of electrical current through an electrical coil 62 comprises the step of directing a flow of a first quantity of electrical current through an electrical coil 62 coupled within said electronically controlled magnetorheological fluid based fan drive assembly 60, wherein said first quantity of electrical current induces a magnetic field having a first strength through said working chamber 99, wherein said first quantity of electrical current is a function of engine speed, engine block temperature, and the composition of said quantity of magnetorheological fluid.

14. The method of claim 12, wherein the step of directing a flow of a first quantity of electrical current through an electrical coil 62 comprises the steps of:

coupling an electronic control unit to said electronic coil 62, said electronic control unit capable of directing a flow of a first quantity of electrical current to said electrical coil 62 to maintain an engine block temperature within an predetermined acceptable range at various engine speeds; and directing a flow of said first quantity of electrical current from said electronic control unit through said electrical coil 62 coupled within said electronically controlled magnetorheological fluid based fan drive assembly 60, wherein said first quantity of electrical current induces a magnetic field having a first strength through said working chamber 99, wherein said first quantity of electrical current is a function of the current engine speed, the current engine block temperature, and the composition of said quantity of magnetorheological fluid.

15. The method of claim 8, further comprising pumping said quantity of magnetorheological fluid from a fluid reservoir 97 to said working chamber 99 through a pump 98.

* * * * *